Figure 1:
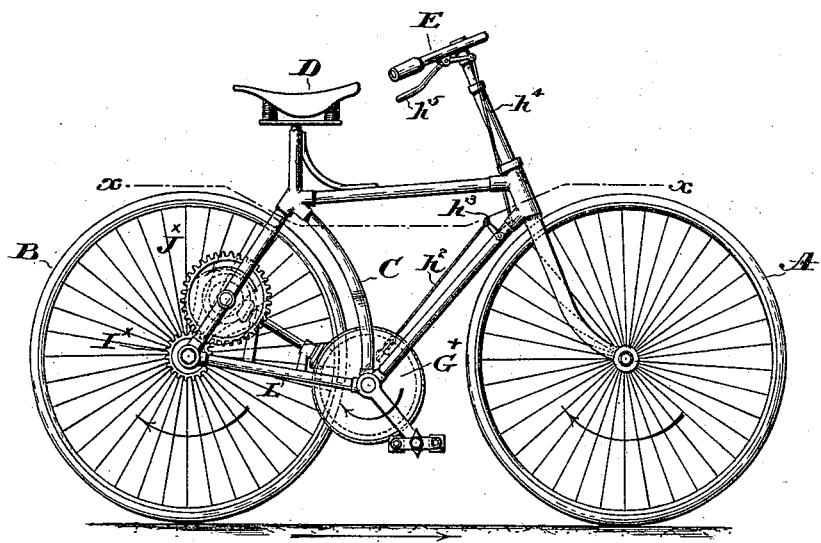

(No Model.)

J. B. EVANS.
BICYCLE.

No. 464,789.        Patented Dec. 8, 1891.

Attest:
J Howard Morris
Lewis Altmaier

John B. Evans
Inventor:
By his attorneys
Strawbridge & Taylor

UNITED STATES PATENT OFFICE.

JOHN B. EVANS, OF PHILADELPHIA, PENNSYLVANIA.

BICYCLE.

SPECIFICATION forming part of Letters Patent No. 464,789, dated December 8, 1891.

Application filed March 31, 1891. Serial No. 387,186. (No model.)

*To all whom it may concern:*

Be it known that I, JOHN B. EVANS, a citizen of the United States, residing in the city and county of Philadelphia, in the State of Pennsylvania, have invented certain new and useful Improvements in Bicycles, of which the following is a specification.

My invention relates generally although not restrictively to a class of bicycles known as "Safeties," consisting, as is well known, of a front wheel, a rear or driving wheel, a main frame, and a crank axle equipped with pedals supported in the main frame and connected with the driving wheel.

Generally stated, it is the object of my invention to utilize a toothed gearing as opposed to a sprocket chain gearing as the power transmitting medium between the crank axle and the driving wheel,—and further to so arrange or apply a toothed gearing that it may be set to apply the rotation imparted to the pedals to speed or power at will.

In the drawings I show and herein I describe a good form of a convenient embodiment of my invention, the particular subject-matter claimed as novel being hereinafter definitely specified.

Figure 2:
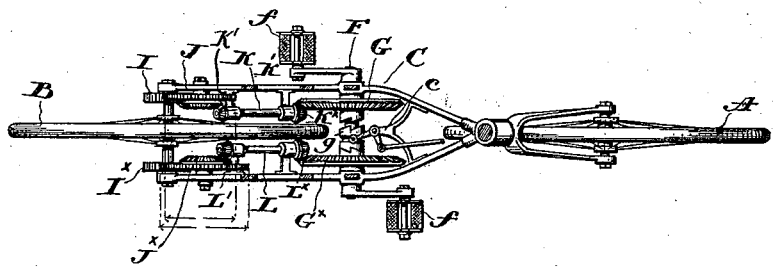
Figure 3:
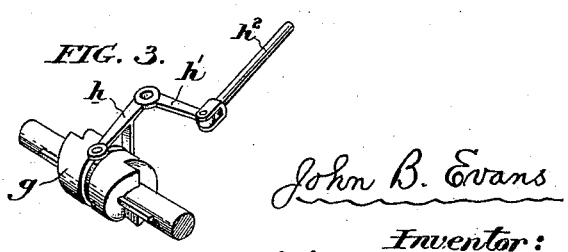

In the drawings, Figure 1 is a view in side elevation of a bicycle embodying a preferred form of my invention. Fig. 2 is a sectional plan on the line $x\,x$ of Fig. 1. Fig. 3 is a view in detail of the clutch.

In the drawings, A is the front or steering wheel, B the driving wheel, C the main frame, D the saddle, E the handle bar, F the crank axle, and $f\,f$ the pedals, of the bicycle represented.

The crank axle is equipped with two clutch faced bevel gear wheels G G$^\times$ mounted and adapted to run free upon the respective extremities of the crank axle. The clutch faces of said wheels are arranged upon the inner faces of their hubs, and the gear or peripheral teeth of said wheels also preferably face inwardly.

$g$ is a clutch mounted upon and keyed to the central portion of the crank axle, and adapted to be thrown into engagement with either of said bevel gear wheels at will, and thereby to lock the wheel so engaged fast to the axle and compel its rotation therewith. Said clutch is, however, also adapted to occupy a position intermediate between, and out of engagement with both of, said bevel gear wheels.

Any convenient means may be employed to throw the clutch. I prefer, however, to employ the arrangement shown in the drawings, which consists of a bell crank lever, mounted upon a bracket or extension $c$ of the main frame, one arm of which, $h$, is forked, and each branch of the fork equipped with a stud, which studs exist on diametrically opposite sides of the clutch and are entered in a common transverse groove or stud way formed in said clutch $g$,—and the other arm of which, $h'$, is engaged with a pitman $h^2$, the upper end of which is connected to one arm of a second bell crank lever $h^3$ pivoted to the front portion of the main frame, to the other arm of which is secured the lower end of a second and vertical pitman $h^4$ which is operatively engaged with a lever handle $h^5$ mounted in connection with the handle bar.

I I$^\times$ are a pair of toothed wheels mounted upon the respective extremities of the axle of the driving wheel.

J J$^\times$ are a pair of compound gear wheels each of which has a double set of teeth, namely, a set of ordinary straight gear teeth and a set of bevel teeth, or teeth the faces of which are inclined to the axes of the wheels. In both said wheels the bevel teeth are formed on the side faces of the wheels at some radial distance inward from the peripheries thereof, while the straight teeth exist on the peripheries of said wheels.

K is a shaft equipped at its front end with a bevel-pinion K$^\times$ and at its rear end with a bevel pinion K', which shaft is supported by means of suitable brackets or supports, erected from the main frame, in such position that its pinion K$^\times$ is in constant engagement with the bevel wheel G, and its pinion K' in constant engagement with the bevel teeth of the wheel J.

L is a corresponding shaft, equipped at its front end with a bevel pinion L$^\times$, and at its rear end with a bevel pinion L', and supported, by means of suitable brackets or supports erected from the main frame, in such position that its pinion L$^\times$ is in constant engagement with the wheel $G^\times$ and its pinion $L'$ in constant engagement with the teeth of the wheel $J^\times$.

The straight teeth of the compound wheels $J$ $J^\times$ are engaged with the teeth of the wheels $I$ $I^\times$ respectively.

It will now be understood that the bevel wheel G is in mesh with a pinion on the front end of a shaft K, the rear end of which is provided with a pinion in engagement either directly or through the intervention of a compound or multiplying wheel with the axle of the driving wheel,—and that the bevel wheel $G^\times$ is connected with said driving wheel axle by a corresponding train of gearing.

The corresponding wheels and shafts of the two trains of gearing, with the exception of the wheels J and $J^\times$, are preferably of equal size, but said wheel $J^\times$ is preferably made of considerably greater diameter than the wheel J, so that a greater amount of rotation of the crank axle is required to produce a rotation of the driving wheel when transmitted through the gearing on one side of the machine than when transmitted through the gearing on the other side of the machine.

In the operation of the bicycle the clutch is thrown into engagement with one of the free bevel wheels on the crank axle, thereby said wheel is locked to and compelled to rotate with said axle, and the motion of the axle is transmitted through the train of gearing of which said wheel forms a part, to the driving wheel, whereby the propulsion of the machine is occasioned. In the arrangement shown, the rotation of the driving wheel through the train of gearing thrown into operation as described, will occasion the, so to speak, reversed operation of the other or second train of gearing, but such rotation will be idle and without effect upon the machine because the crank axle bevel wheel of said second train runs freely upon the crank axle.

My invention provides a strong, rigid, positive, gearing between the crank axle and the driving wheel, which gearing reduces the lost motion to a minimum, is strong and certain in action, and, as explained, can be applied to either speed or power at will. It is, of course, obvious that the toothed gearing may be composed or built up of any desired arrangement of toothed wheels or shafts,—that it permits of any desired multiplication of the rotation of the crank axle, and that it may be employed in connection with any preferred type of wheel.

The various wheels and devices composing the gearing described may of course be applied in connection with ball bearings disposed in a suitable arrangement to facilitate their rotation and utilize the motion imparted to the pedals in the most advantageous manner.

The shafts K and L are especially advantageous in the use of a positive or solid toothed connecting gearing between the crank axle and driving wheel, combining as they do great rigidity and certainty of operation, with the minimum of weight.

Having thus described my invention, I claim:

1. In a bicycle, in combination, a driving wheel, a crank axle, a pair of clutch faced toothed wheels mounted to run on said crank axle, a clutch mounted on and keyed to said crank axle, means for throwing said clutch into alternate engagement with said toothed wheels, the shafts K and L with their bevel pinions, the compound wheels J and $J^\times$, and the wheels I and $I^\times$, all mounted and arranged substantially as set forth.

2. In a bicycle, in combination, the driving wheel connected with which is the toothed wheel I, the crank axle, the bevel wheel G mounted on the crank axle, the compound wheel J provided with peripheral and bevel teeth, the peripheral teeth of which are in mesh with the teeth I, and the shaft K the extremities of which are provided with bevel pinions respectively in mesh with the bevel wheel G and the bevel teeth of the compound wheel J, substantially as set forth.

In testimony that I claim the foregoing as my invention I have hereunto signed my name this 26th day of February, A. D. 1891.

JOHN B. EVANS.

In presence of—
F. NORMAN DIXON,
J. HOWARD MORRIS.